United States Patent [19]

Fiaux et al.

[11] Patent Number: 4,465,722
[45] Date of Patent: Aug. 14, 1984

[54] PROCESS FOR THE PREPARATION OF EPOXIDE RESINS BY THE ADVANCEMENT METHOD

[75] Inventors: André Fiaux, Ollon; Dinh L. Nguyen, Territet, both of Switzerland

[73] Assignee: Ciba-Geigy Corporation, Ardsley, N.Y.

[21] Appl. No.: 507,887

[22] Filed: Jun. 27, 1983

[30] Foreign Application Priority Data

Jul. 8, 1982 [CH] Switzerland ............... 4169/82

[51] Int. Cl.$^3$ ............................. C08G 59/02
[52] U.S. Cl. ............................. 528/88; 528/89; 528/94; 528/103; 528/104
[58] Field of Search ............. 528/103, 104, 88, 89, 528/94

[56] References Cited

U.S. PATENT DOCUMENTS

| 3,444,111 | 5/1969 | Hickner. | |
|---|---|---|---|
| 3,530,093 | 9/1970 | Maurer | 260/47 |
| 3,547,881 | 12/1970 | Mueller et al. | 260/47 |
| 3,634,323 | 1/1972 | Moran | 260/47 |
| 3,824,212 | 7/1974 | Sinnema et al. | 260/47 |
| 4,048,141 | 9/1977 | Doorakian et al. | 260/47 |
| 4,132,706 | 1/1979 | Doorakian et al. | 528/89 |
| 4,302,574 | 11/1981 | Doorakian et al. | 528/89 |
| 4,352,918 | 10/1982 | Whiteside et al. | |
| 4,370,465 | 1/1983 | Whiteside et al. | |
| 4,389,520 | 6/1983 | Gannon | 528/89 |

FOREIGN PATENT DOCUMENTS

| 1204760 | 9/1970 | United Kingdom. |
|---|---|---|
| 1364804 | 8/1974 | United Kingdom. |
| 1398197 | 6/1975 | United Kingdom. |
| 1485345 | 9/1977 | United Kingdom. |

OTHER PUBLICATIONS von W. Fisch, Chimia, 16, 66 (1962).

Primary Examiner—Earl A. Nielsen
Attorney, Agent, or Firm—Luther A. R. Hall

[57] ABSTRACT

The advancement method, i.e., the preparation of epoxide resin mixtures by reaction of compounds containing 2 to 4 phenolic hydroxyl groups with a stoichiometric excess of polyepoxide compounds in the presence of a catalyst, comprises adding glycidol as a chain stopper. The products are used in various industrial fields, for example in surface protection.

10 Claims, No Drawings

PROCESS FOR THE PREPARATION OF EPOXIDE RESINS BY THE ADVANCEMENT METHOD

The invention relates to a process for the preparation of epoxide resins by the advancement method, ie. by reacting compounds containing 2 to 4 phenolic hydroxyl groups with a stoichiometric excess of polyepoxide compounds.

Such processes are known, and many have been described, for example in German Offenlegungsschrift No. 1,808,670 or in German Offenlegungsschrift No. 2,263,175, and proceed in accordance with the following equation:

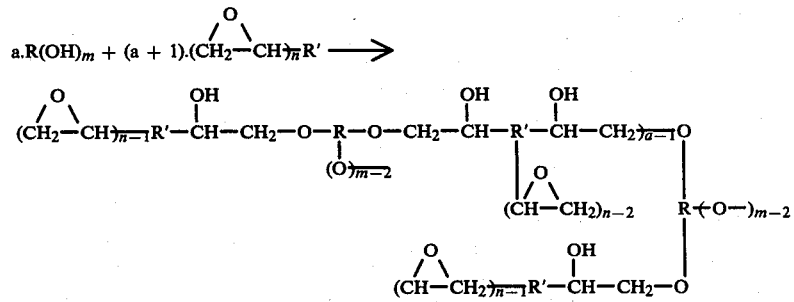

In this equation, m and n independently of one another are 2, 3 or 4. The number a is not less than 1; as a increases, the molecular weight of the product also increases.

The resins prepared by this process are used particularly for surface-coating. These resins generally have a relatively low flexibility. Moreover, their adhesion is not always satisfactory.

Although these disadvantages are non-existent or only slight in epoxide-containing products which are prepared by direct reaction of compounds containing several phenolic hydroxyl groups, for example bisphenol A, with an epihalogenohydrin in certain equivalent proportions (cf., for example, Chimia 16, 66–71, 1962), other disadvantages must be accepted when these products are used, such as impurities, which may be troublesome, and the insufficient control on quality associated with the inadequate purity.

It has now been found that products which do not have the above disadvantages are obtained by addition of glycidol to the starting substances of epoxide resin and polyhydric phenol.

The process according to the invention for the preparation of epoxide resin mixtures by reacting pollyhydric phenolic compounds with epoxide compounds comprises reacting a compound A containing m phenolic hydroxyl groups, m being 2, 3 or 4, preferably 2, with a compound B containing more than one, preferably 2, 1,2-epoxide group(s) in the molecule, and glycidol in the presence of a catalyst at temperatures between 20° and 200° C., A and B being used in amounts such that 0.01 to 0.99 phenolic hydroxyl groups are present per epoxide group, and the amount of glycidol being not more than

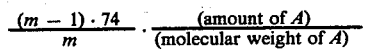

The reaction is preferably carried out in the presence of a nucleophilic catalyst, such as those known from French Patent Specification No. 70.34,479 (Publication Number 2,063,025), such as imidazoles, benzimidazoles, imidazolines, dihydropyrimidines, tetrahydropyrimidines and dihydroquinazolines, in particular methyl- or phenyl-imidazole, preferably 2-phenyl-imidazole.

Other catalysts which can be used are alkali metal or alkaline earth metal hydroxides, preferably sodium hydroxide, and alkali metal or alkaline earth metal alcoholates of the formula $X^n \oplus (OR^{\ominus})_n$, in which X is the alkali metal or alkaline earth metal ion, R is $C_1$–$C_{12}$-alkyl, in particular $C_1$–$C_4$-alkyl, and n is the charge on the alkali metal or alkaline earth metal ion; sodium methylate is particularly preferred. Quaternary ammonium salts, preferably hydroxides or halides of the formula

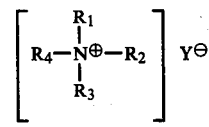

in which $R_1$, $R_2$ and $R_3$ independently of one another are alkyl which has 1–16 C atoms and is unsubstituted or substituted by OH groups, $R_4$ is alkyl having 1–16 C atoms, phenyl or benzyl and Y is hydroxyl or halogen, can also be used, according to the invention, as catalysts. Such catalysts are described in, for example, British Patent Specification No. 1,364,804. Tetraalkylammonium salts, especially tetramethylammonium salts, are preferred. Finally, phosphonium halides of the formula

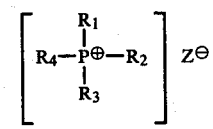

in which Z is a halogen atom, such as chlorine, bromine or iodine, and $R_1$, $R_2$, and $R_4$ independently of one another are monovalent hydrocarbon groups, can also be used as catalysts. $R_1$, $R_2$ and $R_3$ are preferably alkyl, cycloalkyl, aryl, alkaryl or arylalkyl having in each case not more than 25 C atoms, and particularly preferably having in each case not more than 18 C atoms, for example phenyl, butyl, octyl, lauryl, hexadecyl or cyclohexyl. $R_4$ is preferably an alkyl group having 1–10 C atoms, in particular 1–4 C atoms, for example methyl, ethyl, propyl, n-butyl, sec.-butyl or n-decyl. Some examples of the phosphonium haldies suitable as catalysts are methyltriphenylphosphonium iodide, ethyltriphenylphosphonium iodide, propyltriphenylphosphonium iodide, n-butyltriphenylphosphonium iodide, n-decyltriphenylphosphonium iodide, methyltributylphosphonium iodide, ethyltriphenylphosphonium chloride and ethyltriphenylphosphonium bromide, $C_{1-4}$-alkyltriphenylphosphonium iodides being particularly preferred. Such catalysts are described in, for example, British Patent Specification No. 1,204,760. Other suitable catalysts are the phosphorus compounds described in the following patent specifications: U.S. Pat. No. 3,547,881, U.S. Pat. No. 4,048,141, U.S. Pat. No. 4,132,706, British Patent Specification No. 1,398,197 and British Patent Specification No. 1,485,345.

The most preferred catalyst is 2-phenylimidazole.

The amount of catalyst used can be varied within a wide range, and are preferably between 0.0001 and 10% by weight, particularly preferably between 0.0002 and 5% by weight and very particularly preferably between 0.0005 and 1% by weight, based on the total amount of reactants.

All the aromatic compounds which have 2 to 4 phenolic hydroxyl groups and are known in the advancement method can be used as the starting material A. Examples are: mononuclear diphenols (such as resorcinol) or triphenols (phloroglucinol), which may also be substituted, naphthalenes having 2, 3 or 4 hydroxyl groups, such as 1,4-dihydroxy-naphthalene, biphenyls and other dinuclear aromatic compounds carrying a methylene, isopropylene, 0, $SO_2$, S or NR bridge (R is H, lower alkyl or phenyl) and 2 to 4 hydroxyl groups bonded to the aromatic nuclei, such as , in particular, bisphenol A, bisphenol F or bisphenol S; the benzene nuclei can also carry halogen atoms, such as tetrabromobisphenol A. Other compounds are novolaks based on phenol or cresol.

Suitable epoxide compounds B are, in particular, those of relatively low molecular weight, for example less than 3,500, in particular less than 2,000 and preferably between 175 and 350. The di-, tri- or tetra-glycidyl compounds used can be ethers or esters; furthermore, the glycidyl groups can also be linked to nitrogen atoms. The phenols mentioned for A can be phenols on which the ethers may be based. Aliphatic di-, tri- or tetra-hydroxy compounds, for example butane-1,4-diol or polyether glycol, are also suitable. The polyglycidyl esters are based on, for example, phthalic acid, terephthalic acid, tetrahydrophthalic acid, hexahydrophthalic acid, adipic acid, trimethyladipic acid or sebacic acid. Mononuclear or polynuclear hydantoins with glycidyl groups on the nitrogen atoms and, where appropriate on the bridges linking two hydantoin nuclei, bonded via oxygen, such as N,N'-diglycidyl-hydantoins, 1,3-di-(1-glycidyl-5,5-dimethyl-hydantoin-1-yl)-2-glycidyloxy-propane and also 1-glycidyl-3-(2,3-diglycidyloxy-prop-1-yl)-5,5-dimethylhydantoin, are also suitable. Other glycidyl compounds of rings containing nitrogen are those of 5,6-dihydrouracils, barbituric acids, cyanuric acids and isocyanuric acids, such as triglycidylisocyanuric acid.

The most preferred procedure comprises reacting bisphenol A with the diglycidyl ether of bisphenol A together with glycidol.

The amount of starting substance A depends on the type of product desired. The larger the amount, the higher, in general, the molecular weight of the end product. The melting point will also thereby rise, and the physical and chemical properties of the resin obtained will change.

The minimum amount of glycidol used as a chain stopper is 1 mol % per mol of the compound A, and the maximum amount is inversely proportional to the molecular weight of the polyhydric phenol and proportional to the molecular weight of the glycidol (74) and the amount of polyhydric phenol used. The product of these factors should then be multiplied by ½, ⅔ or ¾, depending on whether the phenolic compound contains 2, 3 or 4 phenolic hydroxyl groups.

The reaction can be carried out in 5–95% solutions of the reactants. Examples of suitable solvents are toluene, xylene, methyl ethyl ketone, methyl isobutyl ketone, ethylglycol acetate, butyl acetate, amyl alcohol, dioxane, 2-methoxyethanol, 2-ethoxyethanol and diethylene glycol monon-butyl ether (=butyl carbitol); however, the liquid or liquefied reactants are preferably mixed with one another without the addition of a solvent. Preferred reaction temperatures are between 120° and 180° C.

If a catalyst is used, this must be added slowly in order to avoid a sharp rise in temperature of the mixture, which reacts exothermically. The reaction is preferably carried out under nitrogen, and has ended after some hours. In addition to the advanced epoxide compounds which have at least two epoxide groups in the molecule and carry secondary hydroxyl groups resulting from the reaction, products which, in addition to one or more epoxide groups (the number depends on the type of starting resin and on the proportions) also contain α-glycol groups originating from the reaction of compound A or of the adduct from compounds A and B with the glycidol acting as the chain stopper are also formed. The hardened end products (prepared by crosslinking with conventional hardeners for epoxide resins, such as acid anhydrides, polyamines, polyhydric phenols and the like) have a good flexibility.

The products can be used for surface protection and for the production of castings, especially in the electrical field, prepregs and laminates. They can also be used in the photopolymerisation field and as solder stops and insulation lacquers.

EXAMPLE 1

160 kg of an epoxide compound of bisphenol A and epichlorohydrin having an epoxide content of 5.3 equivalents per kg and a hydrolysable chlorine content of less than 0.1 per cent by weight are introduced into a 250 liter steel reactor. The temperature is increased to 80° C. and the mass is stirred at 40 revolutions per minute. A stream of nitrogen is now passed through the reactor, during which the temperature is increased to 100° C. 62 kg (¾ of the total amount) of bisphenol A and 2.95 kg of glycidol are then added. Thereafter, 50 ml of a solution of 7.5 g of 2-phenyl-imidazole in butanol are added. During the next 30 minutes, the temperature rises to 180° C. 21 kg of bisphenol A are then added and the mixture, which has cooled somewhat, is heated again to 180° C. The mixture is kept at this temperature, with continuous stirring, for 3 hours, the stream of nitrogen being switched off after 30 minutes and the vessel slowly being placed under a vacuum of up to about 67 mbar. When a sample has an epoxide content of 0.57–0.60 equivalents per kg, the reactor is discharged. The yield is 246 kg. A 40% solution in butyl carbitol has a viscosity of 2,000 mPa.s at 25° C. The α-glycol content is 0.35 equivalents per kg.

EXAMPLE 2

173 kg of an epoxide compound of bisphenol A and epichlorohydrin with an epoxide content of 5.3 equivalents per kg and a hydrolysable chlorine content of less than 0.1% by weight are introduced into a 250 liter steel reactor. The temperature is increased to 50° C. 0.2 kg of 50% sodium hydroxide solution is then added in the course of 10 minutes, and the mixture is stirred for 15 minutes. 73.8 kg of bisphenol A are then added. The reaction mixture is de-aerated at 80° C. with nitrogen in vacuo, during which the temperature is increased to 100° C. 2.9 kg of glycidol are added in the course of 10 minutes, with continuous stirring. The temperature rises to 170°–190° C. in the course of the exothermic reaction.

When a sample of the reaction mixture has an epoxide content between 1.15 and 1.22 equivalents per kg, the reactor is discharged. The yield is 249 kg. A 40% solution of the reaction product in butyl carbitol has a viscosity of 570 mPa.s at 25° C. The α-glycol content is 0.3 equivalents per kg.

EXAMPLE 3

200 kg of an epoxide compound of bisphenol A and epichlorohydrin with an epoxide content of 5.3 equivalents per kg and a hydrolysable chlorine content of less than 0.1% by weight are introduced into a 250 liter steel reactor. The temperature is increased to 50° C. 0.5 kg of a sodium methylate solution (6.5% by weight of sodium in methanol) is then added in the course of 10 minutes and the mixture is stirred for 10 minutes. 46.9 kg of bisphenol A are then added. The reaction mixture is de-aerated at 80° C. with nitrogen in vacuo, the temperature being increased to 100° C. 3 kg of glycidol are added in the course of 10 minutes, with continuous stirring. The temperature rises to 150°–180° C. in the course of the exothermic reaction.

When a sample of the reaction mixture shows an epoxide content of between 2.55 and 2.7 equivalents per kg, the reactor is discharged. The yield is 249 kg. The resulting resin has a viscosity of 600 mPa.s at 120° C. The α-glycol content is 0.3 equivalents per kg.

EXAMPLE 4

163 kg of an epoxide compound of bisphenol A and epichlorohydrin with an epoxide content of 5.3 equivalents per kg and a hydrolysable chlorine content of less than 0.1% by weight are introduced into a 250 liter steel reactor. The temperature is increased to 40° C. 0.3 kg of a 5% by weight solution of ethyltriphenylphosphonium iodide in acetone is then added in the course of 10 minutes and the mixture is stirred for 10 minutes. 65 kg of bisphenol A are then added. The reaction mixture is de-aerated at 80° C. with nitrogen in vacuo, during which the temperature is increased to 100° C. 3 kg of glycidol are added in the course of 10 minutes, with continuous stirring. The temperature rises to 150°–180° C. in the course of the exothermic reaction.

When a sample of the reaction mixture has an epoxide content of between 0.55 and 0.6 equivalents per kg, the reactor is discharged. The yield is 231 kg. A 40% solution of the reaction product in butyl carbitol has a viscosity of 1,500 mPa.s at 25° C. The α-glycol content is 0.3 equivalent per kg.

What is claimed is:

1. A process for the preparation of an epoxide resin mixture by reacting a polyhydric phenolic compound with an epoxide compound, which comprises reacting a compound A containing m phenolic hydroxyl groups, m being 2, 3 or 4, with a compound B containing more than one 1,2-epoxide group in the molecule, and glycidol in the presence of a catalyst at temperatures between 20° and 200° C., A and B being used in amounts such that 0.01 to 0.99 phenolic hydroxyl groups are present per epoxide group, and the amount of glycidol being not more than $$\frac{(m-1) \cdot 74}{m} \cdot \frac{(\text{amount of } A)}{(\text{molecular weight of } A)}$$

2. The process according to claim 1, wherein the reaction is carried out at temperatures of 120° to 180° C.

3. The process according to claim 1, wherein the liquid or liquefied reactants are reacted with one another without addition of a solvent.

4. The process according to claim 1, wherein the reaction is carried out in the presence of a nucleophilic catalyst.

5. The process according to claim 1, wherein the catalyst is sodium hydroxide, sodium methylate or a $C_{1-4}$-alkyltriphenylphosphonium iodide.

6. The process according to claim 1, wherein the catalyst is 2-phenylimidazole.

7. The process according to claim 1, wherein a compound A in which m is 2 is used.

8. The process according to claim 1, wherein a compound B which contains 2 epoxide groups in the molecule is used.

9. The process according to claim 1, wherein bisphenol A is reacted with the diglycidyl ether of bisphenol A, together with glycidol.

10. An epoxide resin mixture obtained by the process according to claim 1.

* * * * *